US005790678A

United States Patent [19]
Gudmundson

[11] Patent Number: 5,790,678
[45] Date of Patent: Aug. 4, 1998

[54] DIGITAL AUDIO PROCESSING IN A MODIFIED BITBLT CONTROLLER

[75] Inventor: Daniel Gudmundson, Newmarket, Canada

[73] Assignee: ATI Technologies Incorporated, Thornhill, Canada

[21] Appl. No.: 323,876

[22] Filed: Oct. 17, 1994

[51] Int. Cl.$^{6}$ .......... H04B 1/00
[52] U.S. Cl. .......... 381/119
[58] Field of Search .......... 381/119, 103, 381/29, 30, 31, 32

[56] References Cited

U.S. PATENT DOCUMENTS

| | | | |
|---|---|---|---|
| 4,845,656 | 7/1989 | Nishibe et al. | 364/900 |
| 4,979,039 | 12/1990 | Kisol | 348/422 |
| 5,079,984 | 1/1992 | Kosugi et al. | 84/645 |
| 5,313,576 | 5/1994 | Providenza et al. | 395/164 |
| 5,315,911 | 5/1994 | Ochi | 84/477 R |
| 5,347,631 | 9/1994 | Providenza et al. | 395/164 |
| 5,400,687 | 3/1995 | Ishii | 84/477 R |
| 5,553,220 | 9/1996 | Keene | 381/150 |
| 5,604,322 | 2/1997 | Kikuchi | 84/477 R |
| 5,635,657 | 6/1997 | Lee et al. | 84/477 R |

FOREIGN PATENT DOCUMENTS

| | | | |
|---|---|---|---|
| 0001697 | 1/1981 | Japan | 381/119 |

*Primary Examiner*—Wing F. Chan
*Assistant Examiner*—Xu Mei
*Attorney, Agent, or Firm*—Pascal & Associates

[57] ABSTRACT

A method of processing audio signals is comprised of reading samples of digitally stored audio signals from a first source memory, performing a bit block transfer (BitBLT) of the samples to a register of an arithmetic and logic unit (ALU), reading an array of coefficient signals (coefficients), performing a BitBLT of the coefficients to a register of the ALU, operating on the bit block transferred samples and coefficients together and storing resulting samples in a destination memory, whereby the stored resulting samples can be further accessed for audio reproduction, further processing, permanent storage or transmission.

7 Claims, 2 Drawing Sheets

DIGITAL AUDIO PROCESSING IN A MODIFIED BITBLT CONTROLLER

FIELD OF THE INVENTION

This invention relates to the field of digital computers, and in particular to a method of processing audio signals therein.

BACKGROUND TO THE INVENTION

To process audio signals in a digital computer, with reference to FIG. 1 a memory 1 in which audio signal samples are stored in e.g. a table is read. The samples are typically then low pass filtered in a filter 3, are up-sampled then delta sigma encoded in a 1-bit encoder 5, then low pass filtered again in a filter 7. The resulting audio output stream 9 is provided as a processed output signal.

This process is typically achieved in custom hardware or firmware logic circuits such as in a digital signal processor. Such circuits however are costly since they are special purpose, require the cost of design and manufacture, a socket in the computer, etc.

SUMMARY OF THE INVENTION

In accordance with the present invention, special purpose circuits for processing audio are not needed for the digital computer to process audio. Since a graphics circuit in a digital computer can already perform a bit block transfer (BitBLT) process for graphics data to be visually displayed, that ability is used to process audio using a modification of the BitBLT process.

In accordance with an embodiment of the invention, a method of processing audio signals is comprised of reading samples of digitally stored audio signals from a first source memory, performing a bit block transfer (BitBLT) of the samples to a register of an arithmetic and logic unit (ALU), reading an array of coefficient signals (coefficients), performing a BitBLT of the coefficients to a register of the ALU, and operating on the bit block transferred samples and coefficients together and storing resulting samples in a destination memory, whereby the stored resulting samples can be further accessed for audio reproduction, further processing, permanent storage or transmission.

BRIEF INTRODUCTION TO THE DRAWINGS

A better understanding of the invention will be obtained by reading the description of the invention below, with reference to the following drawings, in which:

FIG. 1 is a block diagram illustrating an audio process in accordance with the prior art, FIG. 2 is a block diagram illustrating a BitBLT process in accordance with the prior art, and FIG. 3 is a block diagram illustrating an audio process in accordance with an embodiment of the present invention.

DETAILED DESCRIPTION OF THE INVENTION

As is well known, a graphics circuit typically is in communication with an expansion bus of the computer, and provides a stream of data to be stored in a display memory. Such graphics circuits are sometimes connected to a VESA or local high speed bus, to which video input and output ports and audio input and output ports are connected through interface circuits. An understanding of graphics circuits, the BitBLT process and how they operate within a digital computer may be obtained from the texts "Graphics Programming for the 8514/A" by Jake Righter & Bud Smith, published by M&T Publishing, Inc., Redwood City, Calif., copyright 1990, and "Fundamentals of Interactive Computer Graphics", by J. D. Foley and A. Van Dam, published by Addison-Wesley Publishing Company of Reading, Mass., copyright 1982.

Figure 1:
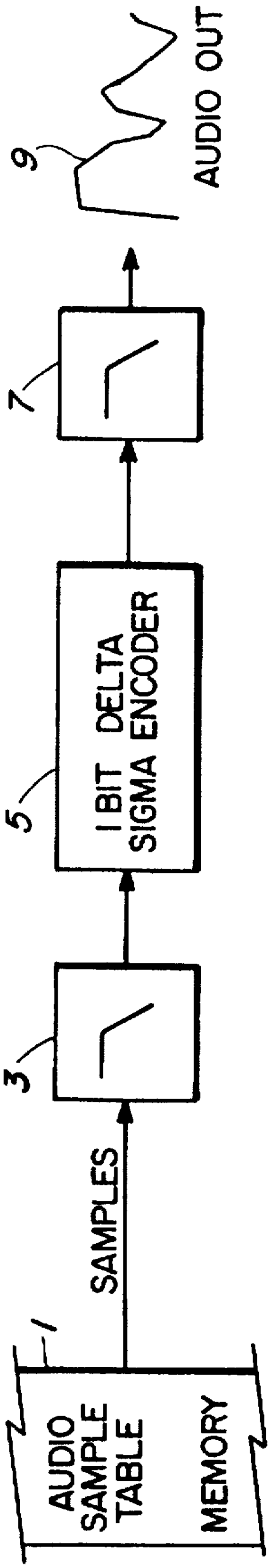
PRIOR ART FIG. 1
Figure 2:
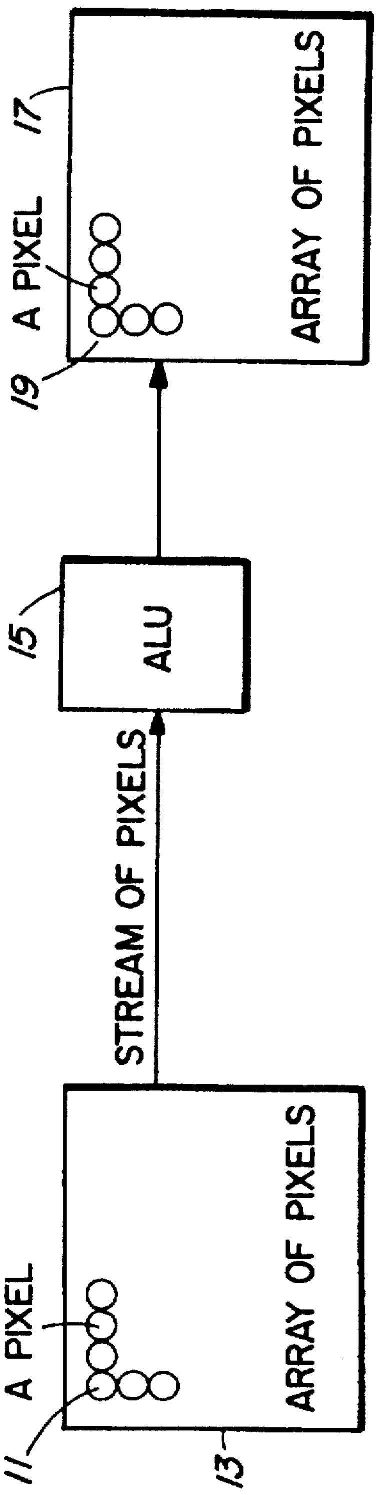

FIG. 2 illustrates a basic BitBLT process, which is carried out by a graphics circuit (graphics processor) of a personal digital computer. Data defining an array of pixels 11 are stored in a source memory 13. This data in the memory is read and after processing in an arithmetic and logic unit (ALU) 15, the data is stored in a destination memory 17 as array 19. The source and destination memories can be the same physical memory.

In the BitBLT process, more than one stream of pixel data can enter the ALU, which can increase the productivity of the BitBLT process. For two dimensional graphics operations the ALU typically performs the following logical operations on the pixel data, where Z represents an output or destination output signal data stream, A represents an input or source signal data stream and B represents a second input signal or second source data stream:

(a) Z=not A;

(b) Z=A OR B;

(c) Z=A AND B;

(d) Z=A XOR B;

(e) Z=COMPOUND (two term function)

(f) Z=(A+B)/2.

Figure 3:
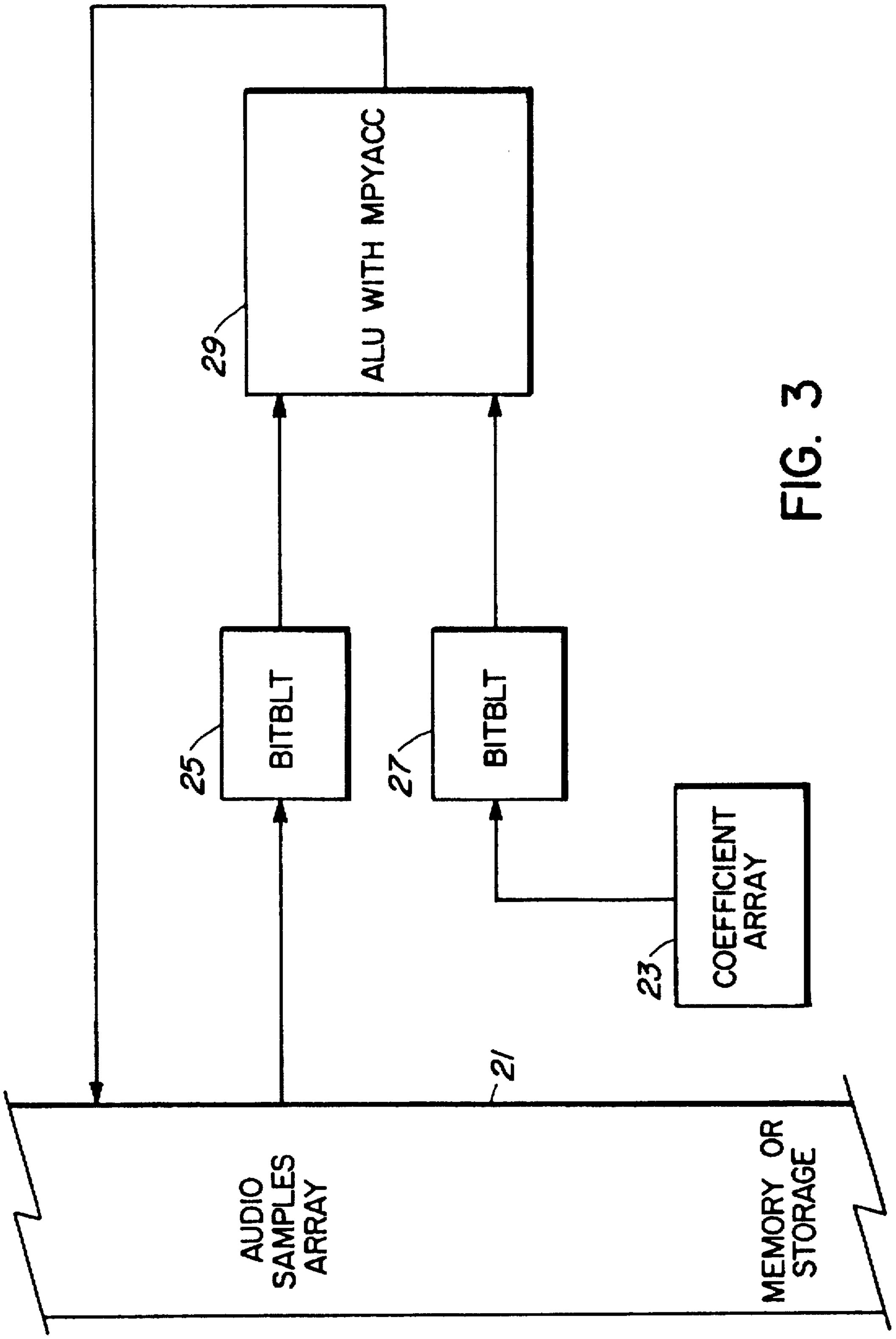

The present invention utilizes the same BitBLT process utilizing two data sources, one being an audio sample source and the second being a coefficient source, as described below with respect to FIG. 3. The use of the term "operating on" in this specification is intended to mean performing any of the aforenoted logical operations.

A source memory 21 stores audio samples in an array. A second source memory 23 stores coefficients in a second array. Each memory is read in a corresponding BitBLT process 25 and 27. The resulting two streams of data are applied to an ALU 29, and after processing, the resulting stream of data is stored in a destination memory, which can be the same physical memory 21 as the source of the audio samples. The destination data can then be provided to audio output circuitry, stored for further processing or transmitted via transmission circuitry to other computers or receivers.

In processing, the ALU multiplies the two data streams together, and the result which is available in the accumulator of the ALU is provided for storage in the destination memory.

It should be noted that the memory storing the coefficients can be random access memory (RAM), can be a hard disk drive, can be a register, or can be latches, flip flops or the like which merely store for a brief instant data received from input circuitry connected to an audio input port, from a CD ROM, etc. The coefficients can be fixed, can be programmable or can be dynamically variable and received from an external source or from the computer itself under control of a program or from a user.

For example, the coefficients can be comprised of samples of another digitally stored audio signal (either dynamically received or statically stored in the second memory). In this case the ALU in operating on the BitBLT data streams together provides a multi-source mixing function. The invention is not limited by use of only one of such coefficient data streams, and any reasonable number n of coefficient data streams can be provided in corresponding BitBLT processes, thus providing a mixing ability of from two to n voices.

The audio samples can be representative of the amplitude of the audio signals, and the coefficients can be programmable, either by an application program or under manual control of a user. In this case the ALU in operating on the BitBLT data streams together provides a volume control function.

The audio samples can be representative of the frequency of an audio signal, and the coefficients can be programmable. In this case the ALU in operating on the BitBLT data streams together provides a frequency filtering function.

The coefficients can be representative of wave samples of digitally stored audio tones from a wave table. In this case the ALU in operating on the BitBLT data streams together proves a synthesis function providing new or modified resulting sample sounds from the audio signals.

The coefficients can be logical true and false signals read at a different rate from the memory 23, whereby the ALU in operating on the BitBLT data streams together provides the resulting samples as the audio signal samples at a rate different from a sample rate stored and read from their source memory. This results therefore in either up-sampling or sample frequency reduction of the audio samples stored in source memory 21.

The coefficients can be comprised of a compression code. In this case the ALU in operating on the BitBLT data streams together provides compression of the samples of audio signals.

The invention is not limited to the particular kinds of audio signals and coefficients noted above, as a person skilled in the art may be able to use the invention to process various other audio signals with these and other coefficients.

By the use of the present invention, audio processing circuitry of the kind previously used need not be incorporated in the computer, since the graphics processing capability of the computer can be used to process the audio. This can be a significant source of cost reduction of the computer.

A person understanding this invention may now conceive of alternative structures and embodiments or variations of the above. All of those which fall within the scope of the claims appended hereto are considered to be part of the present invention.

I claim:

1. A method of processing audio signals comprising:

(a) reading samples of digitally stored audio signals from a first source memory, (b) performing a bit block transfer (BitBLT) of the samples to a register of an arithmetic and logic unit (ALU) in a display graphics processor of a digital computer, (c) reading an array of coefficient signals (coefficients), (d) performing a BitBLT of the coefficients to a register of the ALU in said display graphics processor of a digital computer, (e) operating on the bit block transferred samples and coefficients together and storing resulting samples in a destination memory, whereby the stored resulting samples can be further accessed for audio reproduction, further processing, permanent storage or transmission.

2. A method as defined in claim 1 in which the coefficients are stored in a second source memory and are comprised of samples of other digitally stored audio signals, whereby said operating on step provides a multi-step mixing function.

3. A method as defined in claim 1 in which the samples are representative of an amplitude or of amplitudes of said audio signals, and the coefficients are programmable, whereby said operating on step provides a volume control function.

4. A method as defined in claim 1 in which the samples are representative of frequency of said audio signals, and the coefficients are programmable, whereby said operating on step provides a filtering function.

5. A method as defined in claim 1 in which the coefficients are representative of wave samples of digitally stored audio tones from a wave table, whereby said operating on step provides a synthesis function providing new or modified resulting sample sounds from said audio signals.

6. A method as defined in claim 1 in which said coefficients are logical true and false signals at a rate different from the sample rate of the audio signals stored in the source memory, whereby said operating on step provides said resulting samples as said audio signal samples at said rate different from a sample rate thereof as read from the source memory.

7. A method as defined in claim 1 in which said coefficients are comprised of a compression code whereby said operating on step provides compression of said samples of audio signals.

* * * * *